United States Patent [19]

Dunn et al.

[11] Patent Number: 4,745,740
[45] Date of Patent: May 24, 1988

[54] VELOCITY CONTROLLER FOR RAMJET MISSILE AND METHOD THEREFOR

[75] Inventors: Braxton M. Dunn, Kent; Lawrence E. Fink, Renton, both of Wash.

[73] Assignee: The Boeing Company, Seattle, Wash.

[21] Appl. No.: 833,132

[22] Filed: Feb. 24, 1986

Related U.S. Application Data

[63] Continuation of Ser. No. 428,766, Sep. 30, 1982, abandoned.

[51] Int. Cl.$^4$ ............................................. F02K 7/18
[52] U.S. Cl. ....................................... 60/234; 60/245; 60/251; 60/270.1
[58] Field of Search .................... 60/39.27, 39.29, 233, 60/251, 270.1, 39.23, 245, 234; 137/15.1, 15.2

[56] References Cited

U.S. PATENT DOCUMENTS

| | | | |
|---|---|---|---|
| 2,995,892 | 8/1961 | Kosson et al. | |
| 2,997,843 | 8/1961 | Arnett et al. | |
| 3,220,181 | 11/1965 | Wolf | 60/234 |
| 3,221,496 | 12/1965 | Haake | |
| 3,439,692 | 4/1969 | Pike | |
| 3,535,881 | 10/1970 | Schubert | |
| 3,807,169 | 4/1974 | Bradford | |
| 3,844,118 | 10/1974 | Wilkinson | |
| 3,908,933 | 9/1975 | Goss et al. | 60/270.1 |
| 3,942,320 | 3/1976 | Ortwerth et al. | 60/39.47 |
| 4,050,243 | 9/1977 | Holzman et al. | 60/245 |
| 4,096,803 | 6/1978 | Kesting | 60/270.1 |
| 4,307,743 | 12/1981 | Dunn | |
| 4,428,293 | 1/1984 | Botwin et al. | 60/270.1 |

FOREIGN PATENT DOCUMENTS 669014  3/1952  United Kingdom.

Primary Examiner—Louis J. Casaregola
Attorney, Agent, or Firm—Hughes, Cassidy & Multer

[57] ABSTRACT

A velocity controller for a ramjet missile, having a supersonic inlet proximate the peripheral skin thereof for admitting air to a combustion zone of a ramjet engine, is comprised of a variable pitch cover disposed in pivotable engagement within the inlet and an actuator in operative engagement with the cover for adjustably positioning same over an angular range and thereby modulating airflow for the purpose of controlling flight characteristics and, principally, velocity of the missile. A sensing system is provided for detecting a dynamic flight parameter indicative of velocity of the missile and generating an output characteristic thereof for controlling the actuator and, in turn, the pitch of the cover. Methods for improving the flight performance of both solid fuel ramjet missiles and ducted rocket missiles are also disclosed herein.

4 Claims, 2 Drawing Sheets

VELOCITY CONTROLLER FOR RAMJET MISSILE AND METHOD THEREFOR

This is a continuation of application Ser. No. 428,766 filed Sept. 30, 1982, now abandoned.

CROSS-REFERENCE TO RELATED PATENT

The present invention is related to that disclosed and claimed in U.S. Pat. No. 4,307,743, assigned to the assignee of the present invention; incorporated herein by reference and relied upon.

BACKGROUND OF THE INVENTION

1. Field of the Invention

The present invention relates, generally, to methods and apparatus for controlling the dynamic flight characteristics of a ramjet missile, more especially to velocity controllers therefor, and most particularly to a velocity controller for a solid fuel ramjet missile which regulates velocity and maintains same substantially uniform. In one aspect of the present invention, it further relates to methods and means for reducing the drag experienced by a ducted rocket missile under subcritical inlet operation.

2. Description of the Background Art

Ramjet engines are, of course, well known. These devices are employed for powering aircraft, and particularly missiles travelling at supersonic speeds. Within this context, three basic types of ramjet engines are in use; viz., liquid fuel, ducted rocket, and solid fuel ramjets. Each partakes of the same general similarity of burning a fuel in a combustion chamber in the presence of air admitted thereto through or via a supersonic inlet. A principal distinction regards the manner in which the fuel is supplied to the combustor.

A liquid fuel ramjet employs a spray of fuel into the combustor wherein it is mixed and reacts with the oxidant air admitted through the jet inlet. Thrust is simply and easily regulated by control on the metering valves supplying fuel to the combustor. Ducted rockets rely upon the initial combustion of a fuel-rich propellant in a hot gas generator, whereupon the gases are thence injected into an aft combustor for further oxidation reaction with admitted air. The fuel flow, in the hot gas state, is essentially constant and independent of flight conditions. However, different situations obtain in respect of the combustion characteristics responsible for thrust (and hence velocity) of a solid fuel ramjet engine.

The propellant in a solid fuel ramjet, termed a fuel grain, is in the form of a hollow, shaped-sustaining mass of, e.g., a hydrocarbon, having a central port through which air may pass. Admission of air through a supersonic inlet to the central port provides the necessary oxidizer for combustion of the grain. The rate of combustion is dictated by the mass flow rate of oxidizing air through the grain and, accordingly, is sensitive, inter alia, to the speed of the aircraft, its altitude and the inlet size. To a certain extent, the fuel grain can be designed with limited pre-programming of flight parameters in mind by providing radial gradients in the physical and/or chemical characteristics of the grain to be responsive to anticipated flight conditions; but that is not always possible or even desirable.

Usually, the fuel in a solid fuel ramjet engine is combusted in two stages. The initial interaction between the fuel grain and the oxidizing air is typically incomplete, leaving a fuel-enriched gas. This gas is subjected to further oxidation in an aft section or stage prior to exiting the engine and providing thrust for the aircraft. This has led to one proposal for controlling the flight characteristics of, e.g., a missile employing a solid fuel ramjet engine, known as a variable bypass. That approach incorporates a dual flow path for inlet air, segregating it into a first portion routed to the combustor for contact with the fuel grain and a second portion routed to the aft section out of contact with the fuel grain for secondary combustion of incompletely burned fuel gases. While this approach has achieved some measure of control on the burning rate of fuel, the concept still leaves something to be desired. For example, the thrust developed by the solid fuel ramjet engine is proportional to the flow rate of gas through the exit port. The bypass approach admits the same volume flow rate of air through the inlet, merely apportioning the same between two ultimately recombining paths. Accordingly, thrust modulation is not completely achieved since total airflow remains constant.

U.S. Pat. No. 3,844,118 is generally representative of a type of bypass used to control the dynamic flight characteristics of a solid fuel ramjet by varying airflow to the solid fuel grain. That patent discloses a preference for the air inlet proximate the juncture of the fuel grain and the secondary or aft combustion section to avoid the need to install lengthy piping systems between the inlet and the secondary chamber to which the majority of inlet air is admitted. A forwardly-disposed return member routes primary combustion air along an isolated portion of the circumference of the fuel grain, through a flow controlling valve to the central port thereof. Adjustment of the valve apportions the primary and secondary airflows between that for combustion of the fuel grain and secondary combustion of fuel-rich gases, respectively. The U.S. Pat. No. 3,844,118 approach strives to provide thrust control simply on the basis of this dichotomy of flow and is implemented with subsonic airflow. Further, the location of the control valve, at the head of the port through the fuel grain, may adversely affect the flame out limits of the engine.

U.S. Pat. No. 3,220,181 is conceptually similar to the '118 reference, insofar as total airflow is constant and control is performed internally with subsonic flow. Although the mechanical implementation for apportionment differs somewhat, the same basic concept of bypass is relied upon.

U.S. Pat. No. 4,050,243 and British Pat. No. 669,014 both involve methods and means for controlling the flight characteristics of a solid fuel ramjet, and in a fairly similar way. The U.S. Pat. No. 4,050,243 patent allows subsonic airflow to reach the fuel grain in a type of on-off manner through a translatable tube-in-hole injector. The British Pat. No. 669,014 similar, excepting the fact that the on-off function is performed with supersonic flow at the front of the engine.

U.S. Pat. No. 4,307,743, assigned to the assignee of the present invention, is remarkable as respects the present invention. The U.S. Pat. No. 4,307,743 patent discloses a dynamic start device for an overcontracted, mixed compression, supersonic inlet for ramjet powered missiles. It comprises an air inlet opening for admitting external air into a duct leading to the ramjet engine combustor, wherein the inlet has opposed lip portions with one extending beyond the other, a cover hingedly fixed to the forward edge of the forwardmost lip and a support for holding the cover in a position where it extends between the lips to close the air inlet. A means is provided for releasing the support while the missile is at a supersonic speed, whereby the cover will be forced to rotate about the hinged connection and open the inlet by the force of air impinging on its outer surface. In that manner, dynamic start is achieved. Thus, that patent discloses an inlet with an interposed cover moveable from a first closed to a second open position; albeit, velocity control, per se, is not an objective of that patented device.

U.S. Pat. Nos. 3,439,692, 2,997,843, and 2,995,892, disclose various designs for air inlets used to admit combustion air to a jet engine. Of these, the U.S. Pat. No. 3,459,692 patent is perhaps most noteworthy insofar as it discloses an inlet structure permitting "air spilling" in order to match the available airflow to that required by a turbojet engine. The U.S. Pat. No. 2,997,843 patent is conceptually the same, save the fact that the turbojet airflow matching is automatically performed by an integrated pneumatic system. The U.S. Pat. No. 2,995,892 device varies the compression of airflow and, accordingly, influences the efficiency of the propulsion system. None of these devices, however, is used to vary in a direct manner the engine thrust as is the goal herein.

Returning to a brief consideration of ducted rocket missiles, as respects a related goal of the present invention, its sometimes occurs that back pressure in the combustor becomes so great as to force flow spillage in front of the inlet. This situation is termed "subcritical inlet operation"; wherein a subcritical inlet spills its flow by means of a normal shock system creating, in turn, a large incremental increase in missile drag. To date, a simple yet efficient means to overcome the unwanted and undesirable normal shock system accompanying subcritical inlet operation has yet to be devised.

Accordingly, and in light of the foregoing discussion, the need exists to provide a simple yet efficient and reliable means for controlling the flight characteristics of ramjet-powered missiles; in the context of a solid fuel ramjet, control over the velocity thereof and in the context of a ducted rocket, over subcritical inlet operation.

SUMMARY OF THE INVENTION

The present invention advantageously provides a mechanically simple yet efficient and reliable velocity controller for a solid fluid ramjet improving the dynamic flight characteristics of, e.g., a missile. The present invention is desirable for its ability to control thrust, and hence velocity, without the need to resort to elaborate tailoring of the physical and/or chemical characteristics of the solid fuel grain or the flight trajectory to take into account variations in mass airflow rate over the course of a flight. In one adaptation of the present invention, it is equally well possible to improve the flight conditions encountered by a ducted rocket during subcritical inlet operation.

The foregoing, and other, advantages of the present invention are realized in one of its aspect by a velocity controller for a ramjet missile having a supersonic inlet proximate the peripheral skin thereof for admitting air to a combustion zone of the ramjet engine, comprising a variable pitch inlet cover disposed in pivotal engagement within the inlet and actuator means in operative engagement with the cover for adjustably positioning same over an angular range from fully open to fully closed and thereby modulate the airflow through the inlet. In a particularly preferred implementation, the velocity controller further includes sensing means for detecting a dynamic flight parameter indicative of velocity and providing an output characteristic thereof, which sensing means is in operative communication with the actuator for controlling the position of the inlet cover. Along those lines, the sensing means preferably detects acceleration of the missile and generates an output inversely proportional thereto so that acceleration results in a modulation of airflow reducing same whereas deceleration results in the opposite effect. In a highly preferred, exemplary embodiment, the supersonic inlet includes opposed lip portions one of which extends beyond the other and the inlet cover is hingedly affixed to the forward edge of the forwardmost of those lip portions and engages the other of the lip portions when in the fully closed position. The actuator means in that embodiment includes linkage means in engagement with the cover intermediate the length thereof for pivotal movement of same about a forward hinge line. In that case, the cover initially is deployed in a fully closed position and is capable of release and pivotal movement to a fully open position in order to achieve dynamic start and acceleration to a predetermined velocity; whereupon the actuator means partially closes the inlet cover to reduce the mass airflow rate to the fuel grain, and thence provides variable thrust modulation as required to maintain that desirable velocity substantially constant. While dynamic start may be achieved in that manner, the velocity controller is equally well suited to provide the same variable thrust modulation under self-starting conditions for the engine. In another aspect of the invention, similar structure is provided for the supersonic inlet of a ducted rocket missile. In the event of subcritical inlet operation, the pivotal cover is manipulated by the actuator to spill excess air across the inlet and establish an oblique shock system with an accompanying reduced incremental drag increase over that otherwise experienced by a normal shock system heretofore characteristic of that mode of operation.

The foregoing and other advantages of the present invention will become more apparent, and a fuller appreciation of its structure and operation will be gained, upon an examination nation of the following detailed description of the invention, taken in conjunction with the figures of drawing, wherein:

DETAILED DESCRIPTION OF THE INVENTION

Figure 1:
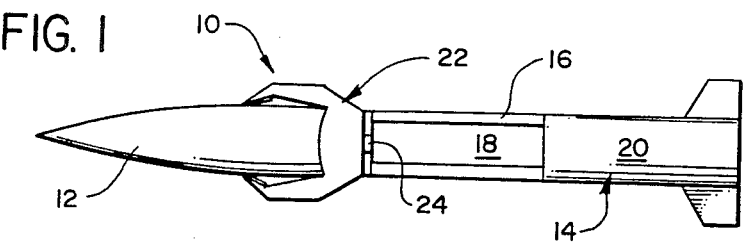
FIG. 1 is a diagrammatic side elevation view of the basic components of a solid fuel ramjet missile.

The present invention relates generally to methods and means for controlling the flight velocity of a solid fuel ramjet and, more specifically, to such methods and means for maintaining a substantially constant velocity during the flight of a missile powered by a solid fuel ramjet. Accordingly, the invention will now be described with reference to certain preferred embodiments within the aforementioned context; albeit, those skilled in the art will appreciate that such a description is meant to be exemplary only and should not be deemed limitative. For example, as will be noted in somewhat greater detail below, certain advantages may be achieved in the operation of a ducted rocket missile through adaptation of the principles of the present invention; and those implementations and related benefits are envisioned to be equally well within the scope of the present invention.

Air breathing missiles generally have some means of velocity control by a modulation of fuel flow rate. However, a solid fuel ramjet propulsion system essentially has no moving parts and, therefore, there is no workable means for varying fuel flow rate. Some degree of passive velocity control is achievable by very careful integration of the fuel grain design, inlet design and trajectory tailoring. While that objective may be achieved in theory, oftentimes the tailoring of, e.g., trajectory profile necessary to provide desirable velocity control may be incompatible with mission goals and place a disproportionately heavy burden on the guidance system. Obviously, design changes in the fuel grain and/or inlet with an eye toward velocity control is only as practical as the ability to project flight parameters well in advance; and then, once in place, become unalterable.

The fuel flow rate of a solid fuel ramjet as well as the thrust is proportional to the mass airflow rate through the central port of the fuel grain. Certain dynamic parameters during flight therefore have immense effect on the dynamic cruise performance of such a propulsion system. Mass flow rate of oxidant air is undoubtedly the parameter of paramount interest in this regard. With combustion (i.e., oxidation) of the fuel grain responsible for thrust, the mass flow rate of air through the port in the fuel grain provides more or less oxidant for that task. Likewise, gas ejected through the propulsion system significantly influences the thrust developed by the ramjet. Further related to the foregoing is the cruise altitude of the missile, as the more rarified atmosphere at high altitude, implying a significant reduction in the mass airflow rate admitted to the fuel grain, will alter the flight characteristics. The present invention provides both a method and a means which successfully overcome the varying extremes experienced by a solid fuel ramjet missile during the course of a flight in order to maintain its velocity substantially uniform without resorting to elaborate, costly measures or one which may be antagonistic to the flight objective of the missile.

Turning specifically to the figures of drawing, in each of which like parts are identified with like reference characters, FIG. 1 illustrates a missile, designated generally as 10, powered by a solid fuel ramjet engine. The missile includes a nose 12 and a tail 14 including stabilizing fins, as is conventional. Intermediate its length, and comprising the ramjet, is a solid fuel grain 16 having a central port 18 through which air is admitted for primary combustion. An aft section 20 beyond the fuel grain 16 is provided for secondary combustion of the fuel-enriched gases emanating from the grain itself. Air for that purpose is admitted through a supersonic inlet structure designated generally as 22, shown to be forward of the grain, which leads, ultimately, to an inlet 24 within the grain area.

Figure 2:
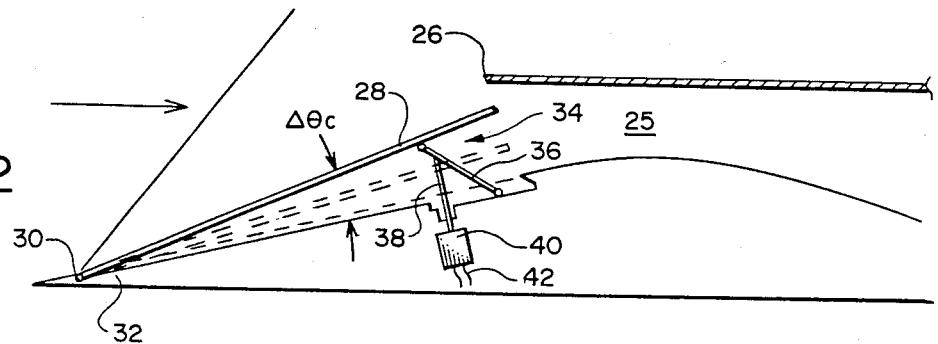
FIG. 2 is an enlarged sectional view through a supersonic inlet of the missile of FIG. 1.
Figure 3:
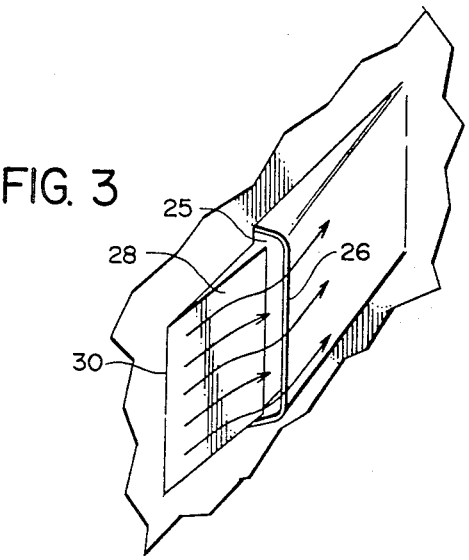
FIG. 3 is a fragmentary, isometric view of the inlet of the FIG. 2.

FIGS. 2 and 3 illustrate the principal structure of the inlet 22. For the details of the use of such an inlet for dynamic starting of the ramjet engine, reference is made to U.S. Pat. No. 4,307,743. In capsule summary, a throat 25 is defined immediately interiorly of a lip 26 and through which throat air passes for ultimate oxidation of the fuel grain 16. A hinged cover plate 28 pivotable about a hinge means 30 on a cooperating lip 32 is moveable from a closed configuration, blocking air from entering the throat 25, to an open configuration allowing airflow to the grain. Dynamic start may be achieved by opening the cover member 28 fully upon boosting the missile 10 to supersonic speed and admitting air to oxidize the fuel grain.

The foregoing description of the inlet of the U.S. Pat. No. 4,307,743 patent is highly simplified; sufficing for present purposes in the description of the instant invention. There are other considerations important in the context of the invention disclosed and claimed in the U.S. Pat. No. 4,307,743 patent which warrant no detailed mention here and, accordingly, reference is made to that patent for a fuller description thereof. The overlapping significance between the two is the adaptation of that basic structure for the purpose of velocity control of the solid fuel ramjet propulsion system of missile 10.

Turning specifically to that objective, the hinged cover 28 is disposed for variable displacement across the inlet 22 in order to admit more or less air through the throat area 25, spilling excess as indicated diagrammatically in FIG. 3. As flight conditions dictate, the hinged cover 28 will move toward an open position, as shown in phantom lines in FIG. 2, in order to admit more air to increase the thrust of the missile 10; vice versa, to a more closed configuration restricting its flow should thrust require reduction. Thus, the cover angle $\Delta\theta_c$ is made variable in order to modulate oxidizing air admitted to the fuel grain. Manipulation of the cover 28 is achieved in the exemplary embodiment of FIG. 2 by means of a scissors linkage assembly 34. The assembly 34 is shown to include a first leg bridging the cover plate 28 and the lip surface 32 and disposed for pivotal movement about a juncture with a second leg 38. The leg 38 is in operative communication with an actuator means 40; whereby the actuator may cause the leg 38 to move along a generally linear path pivoting the leg 36 to open and close the cover 28 as may be required. Certainly, other structural means of control may be employed to good advantage, provided the same is capable of positioning the cover plate 28 at a desirable angle and maintaining the same in a generally rigid configuration during flight (with due consideration for the fact that air admitted to the throat 25 is supersonic).

With the objective of maintaining a generally constant velocity for the missile 10, a suitable sensor is included in order to detect a dynamic flight parameter indicative of velocity. Any number of sensor systems might be utilized, those focusing on acceleration, either directly or indirectly, being most preferred. In any event, when the sensor detects an acceleration (either positive or negative) its output is coupled to the actuator 40 via lines 42. Should the sensor detect a deceleration, the actuator will move the cover plate to a lower position, such as that shown in phantom lines, admitting more air for the purpose of increasing the combustion rate in the fuel grain and, hence, thrust. Should acceleration be detected, the cover will be moved toward a more restrictive position thereby spilling excess air beyond the throat area. Over the course of flight, as the missile cruises through its trajectory, the panel is thus manipulated for the purpose of modulating airflow in order to maintain the desirable constant velocity conditions.

The graphs of FIGS. 4A-4D illustrate the benefits achieved by maintaining the velocity of missile 10 substantially constant over the course of its flight. In each of these figures, the abscissa represents cruise altitude in thousands of feet, with the range 40,000-80,000 being of principal interest; while the ordinate is respectively labeled to show a parameter of interest.

Figure 4A:
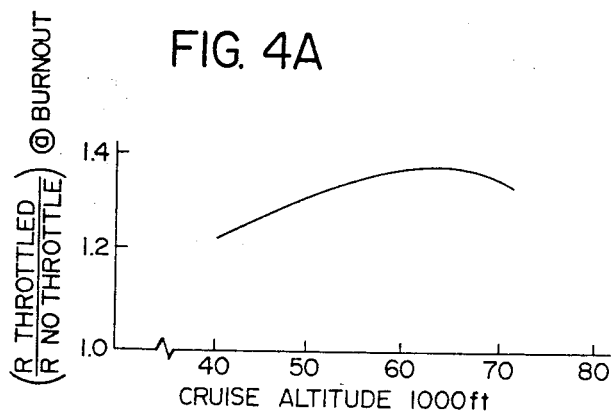
FIGS. 4A–4D are graphic representations of flight characteristics of a missile incorporating the inlet of FIG. 2, showing improvements achieved by practicing the present invention; and, FIG. 5 is a graphic representation of airflow modulation for various cover deflection angles for differing cowl designs.

Turning first to FIG. 4A, the graph shows a ratio of range for a missle 10, comparing that where the missile is subjected to airflow modulation in accordance with the present invention versus a situation where the cover opening is maintained in a constantly open position without the benefit of velocity control. Over the entire scale, range is improved by maintaining velocity constant as a more efficient burning of the fuel grain is achieved. Dramatic results are obtained by employing airflow modulation for velocity control within the altitude range of about 50,000-70,000 feet. The curve peaks at slightly less than a ratio of 1.4; nearly a 40% increase in range for the missile 10 at burnout.

Figure 4B:
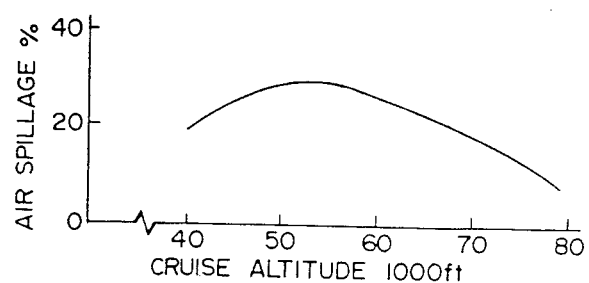

FIG. 4B illustrates the percentage of air to be spilled across the inlet 22 over the course of the flight represented in FIG. 4A. As can be seen, approximately 20% of the airflow which would normally enter throat area 25 must be diverted at an altitude of about 40,000 feet. As the missile continues climbing, spillage likewise increases to a maximum of nearly 30% at an altitude between 50,000 and 60,000 feet. As density of the air decreases upon gaining altitude, the amount of air spilled begins to decrease with progression of the flight. Accordingly, by the time the missile 10 has climbed to 80,000 feet, the cover 28 is manipulated inwardly to spill only about 10%.

Figure 4C:
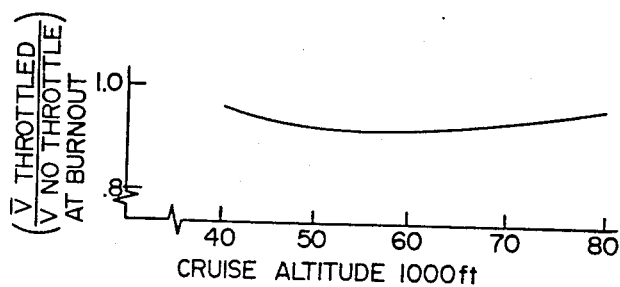
Figure 4D:
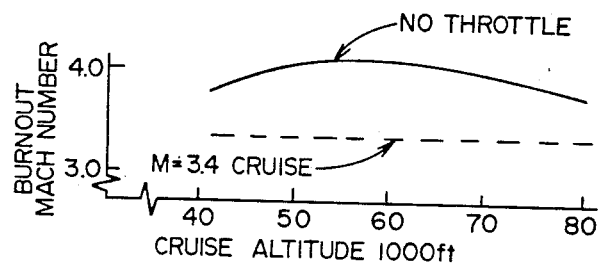

Comparing FIGS. 4C and 4D, the latter shows the velocity characteristics typical of a solid fuel ramjet design without a velocity controller—resulting in missile acceleration as a function of altitude—while FIG. 4C represents the ratio of average velocity of a missile with velocity control to that without. Elimination of acceleration (FIG. 4D) necessarily causes a reduction in the average velocity (FIG. 4C) with a corresponding increase in range (FIG. 4A). The degree of these increases (and reductions) is a function of altitude; but as is evident from a comparison of FIG. 4A with FIG. 4C, the percentage reduction in average velocity is significantly less than the percentage increase in range at corresponding altitudes. Taking FIGS. 4A-4D collectively, it is therefore apparent that implementing velocity control to maintain velocity substantially constant over the course of flight leads to substantial benefits; among which the dramatic improvement in range is highly noteworthy.

Figure 5:
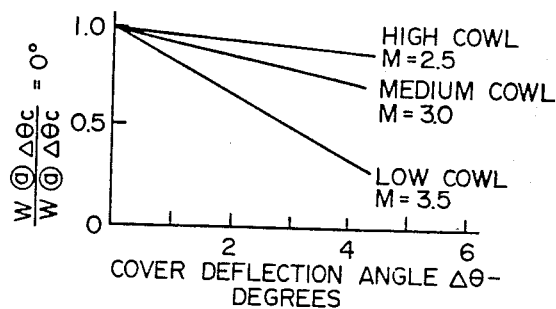

FIG. 5 shows the manner in which the benefits of airflow modulation are achieved for varying cowl configurations. The abscissa of the graph of FIG. 5 represents the cover deflection angle of the pivotal cover 28 from zero through 6° while the ordinant shows the ratio of air admitted without velocity modulation versus modulation over the range of deflection angles illustrated. Thus, the graph shows both the amount of air passing through the inlet as a function of cowl position and also the cover deflection angle. At zero, the cover is fully open and corresponds, accordingly, to a non-modulated condition. Yet, for only a few degrees deflection, demonstrable changes in airflow are achieved.

Taking, for example, the low cowl profile, a cover deflection of but about 3° reduces the airflow to about 50%. Following the trend, somewhat greater deflection angles are required for that extreme spillage requirement when considering either a medium cowl or high cowl configuration. Nonetheless, for the indicated velocities corresponding to the cowl configurations, it cannot be gainsaid that very little manipulation of the pivotable cover is required for very considerable modulation effects. In turn, that leads to an ease in the implementation of the structural embodiments of the present invention as opposed to the need to resort to very elaborate mechanisms.

The foregoing description of preferred embodiments is based principally upon the benefits achieved in the modulation of airflow admitted to a solid fuel ramjet engine. However, the same structure shown in FIG. 2 can be used to good advantage in a ducted rocket missile. Ducted rockets employ a fuel rich propellant combusted in a first stage in a hot gas generator, from which the gases are then injected into an aft combustor for further oxidation with incoming air. The fuel flow in the hot gas state is essentially constant and independent of flight conditions. However, there are flight conditions encountered by a ducted rocket in which the back pressure in the combustor becomes so great as to force flow spillage in front of the inlet—a situation dubbed subcricital inlet operation. A subcritical inlet spills airflow by means of a "normal" shock system which, in turn, causes a large incremental increase in missile drag. The variable pitch cover assembly of FIG. 2 can be used beneficially to spill the required amount of air via an oblique shock system as shown in that figure. Oblique shock systems result in a much lower incremental drag increase than normal shock systems; and, accordingly, flight performance of a ducted rocket under subcritical inlet operation can be materially enhanced by implementation of that structure and corresponding method of control under those circumstances. While perhaps technically a misnomer, the "velocity controller" of the present invention in its drag-reducing role as respects a ducted rocket nonetheless affords control of velocity indirectly by virtue of the lesser drag due to the oblique shock system.

While the invention has now been described with reference to certain preferred embodiments and suggested modes of operation, those skilled in the art will appreciate that various substitutions, modifications, changes, and omissions may be made without departing from the spirit thereof. Accordingly, it is intended that the scope of the present invention be limited solely by that of the claims granted herein.

What is claimed is:

1. A control system for a ramjet missile where said missile has a front end and a rear end, and where said missile comprises:
   (a) a combustion section defining a through combustion passageway and containing a solid fuel positioned adjacent to said passageway;
   (b) an inlet section defining an air inlet having an air inlet area into which ambinet air flows;
   (c) an air passageway which leads from said inlet to said combustion passageway and which is arranged so that substantially all of the air entering the inlet flows through said air passageway and into said combustion passageway said control system comprising:

(a) inlet area cover means positioned at said inlet and being movable from at least a maximum area position where there is maximum air flow into said inlet, to intermediate positions at which there is a lesser air flow into said inlet;

(b) actuating and control means to move said inlet area cover means between said maximum area position and said intermediate positions so as to control air flow into said inlet as a means of controlling burn rate of said fuel to in turn control velocity of the missile;

(c) said control system being characterized in that said actuating and control means is substantially solely responsible for controlling burn rate of the fuel by regulating movement of the inlet closure means to control the amount of air entering said inlet;

(d) said inlet section comprising an edge lip portion having an inside surface portion at least partly defining said inlet and an outside surface portion, said inlet cover means comprising a cover member mounted to be movable toward and away from said edge lip portion so as to cause greater or lesser amounts of air to be diverted from said inlet and spilled over said outside surface portion;

(e) said cover member having a forward end and a rear end, said cover member being pivotally mounted at the forward end with the rear end of the cover member being movable angularly toward and away from said edge lip portion.

2. The system as recited in claim 1, wherein the forward end of the cover member is pivotally mounted at a location forward of said lip edge portion, and the rear end of the cover member is positioned more closely adjacent to said lip edge portion.

3. The system as recited in claim 2, wherein said cover member is pivotally mounted to support structure positioned relative to said inlet oppositely from said edge lip portion, said cover member being movable away from and toward said support structure, said actuating and control means comprising an actuating member mounted to said support structure and operatively connected to said cover member.

4. The system as recited in claim 1, wherein said cover member is pivotally mounted to support structure positioned relative to said inlet oppositely from said edge lip portion, said cover member being movable away from and toward said support structure, said actuating and control means comprising an actuating member mounted to said support structure and operatively connected to said cover member.

* * * * *